April 29, 1952      E. SKILLMAN      2,594,692
SYNCHRONIZING MEANS FOR ROTORS
Filed Sept. 29, 1951      2 SHEETS—SHEET 2
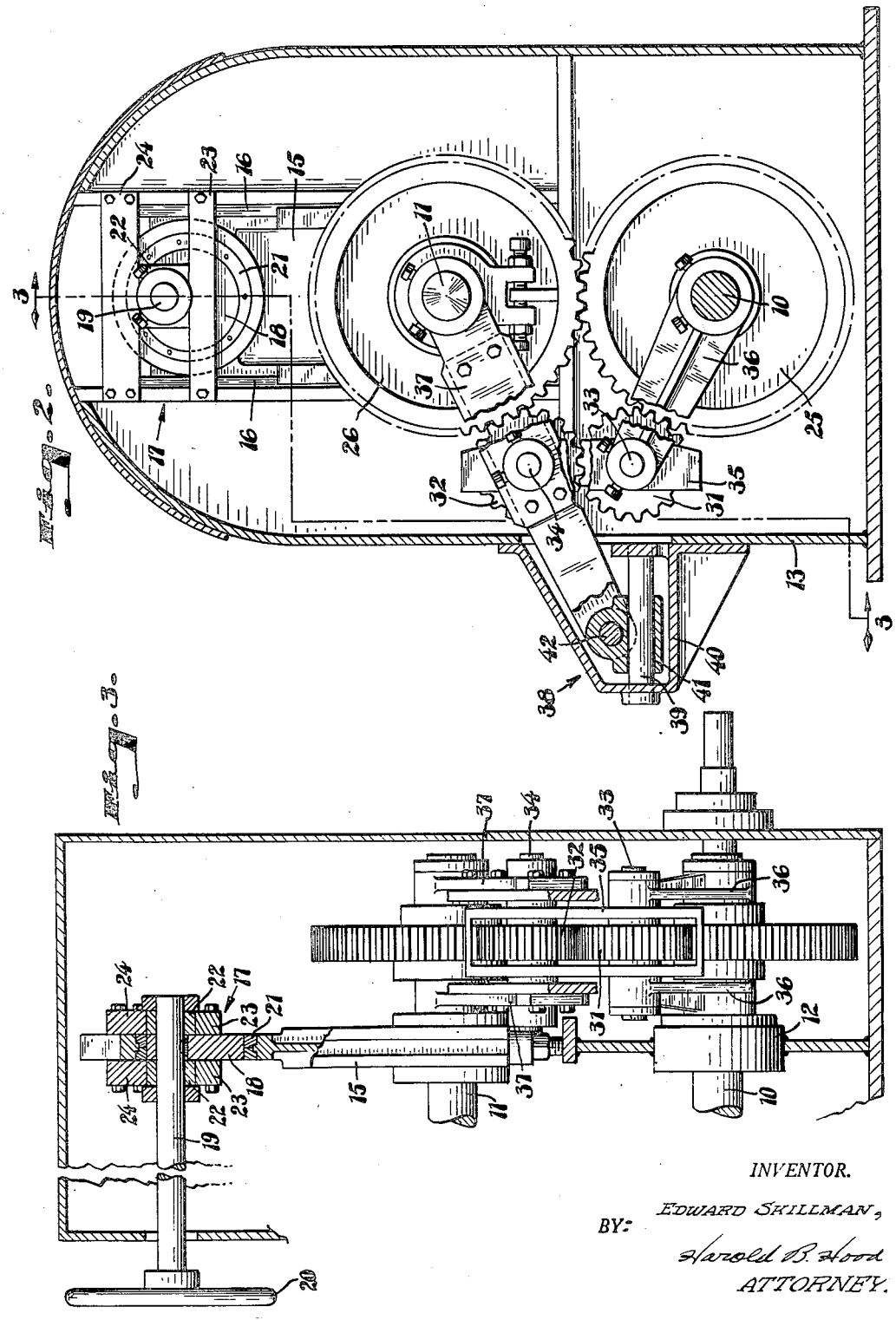
INVENTOR.
EDWARD SKILLMAN,
BY:
Harold B. Hood
ATTORNEY.

Patented Apr. 29, 1952

2,594,692

UNITED STATES PATENT OFFICE 2,594,692

SYNCHRONIZING MEANS FOR ROTORS

Edward Skillman, Enterprise, Kans., assignor to The J. B. Ehrsam & Sons Manufacturing Co., Enterprise, Kans., a corporation of Kansas Application September 29, 1951, Serial No. 248,993

7 Claims. (Cl. 74—397)

The present invention relates to a synchronizing device for rotors and finds its primary utility in a machine for cutting, punching, scoring, imprinting or otherwise acting upon a continuously-flowing stream of material such, for instance, as that disclosed in my prior patent No. 2,561,826 issued July 24, 1951, but is not limited to such use. In such a machine, there is provided a pair of rotors mounted on parallel axes and respectively carrying gears which are normally meshed during certain periods but which, as a result of relative adjustment of said rotors, are separated from intermeshing relation during other periods. The primary object of this invention is to provide mechanism for maintaining absolute synchronism between two such rotors during the periods of separation of the gears respectively carried thereon.

Specifically, it is an object of this invention to improve the synchronizing mechanism shown and described in the above-mentioned patent. As shown therein, the mechanism comprises a pair of intermeshing idler gears, each arranged to mesh with one of the rotor gears. Two links are disposed on opposite sides of the lower such gear for oscillation about the axis of the respective rotor and are journal-connected to the axle carrying the lower idler gear; a similar single link is arranged for oscillation about the axis of the upper rotor and is similarly journal-connected to the upper of said idler axles. These links hold the idlers in mesh with the respective rotor gears. Another link is arranged parallel with the first-mentioned two links, one end thereof being journal-connected to the second-mentioned idler axle on the side of said idler opposite the second-mentioned link, and the other end of the last-named link is journalled for oscillation about an axis disposed in the line joining the rotor axes and substantially midway between those axes.

In actual use of this previously-disclosed structure, it was found that the upper idler axle was placed under considerable twisting stress which resulted in unnaturally rapid and uneven wear on the teeth of the gears enmeshed with that idler. Such tooth wear and the twisting of the idler axle out of proper alignment resulted in a failure of the mechanism to maintain the rotors in precise synchronism during periods in which the rotors were separated. The primary object of this invention is, therefore, to provide an improved, simple, and rugged mechanism for more perfectly accomplishing the desired result.

Ancillary objects will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 2 is an end view (on reduced scale) of the machine shown in Fig. 1, looking from the right as viewed in Fig. 1 and showing my invention as used therein; and Fig. 3 is a sectional view taken on line 3—3 of Fig. 2 and looking in the direction of the arrows.

Figure 1:
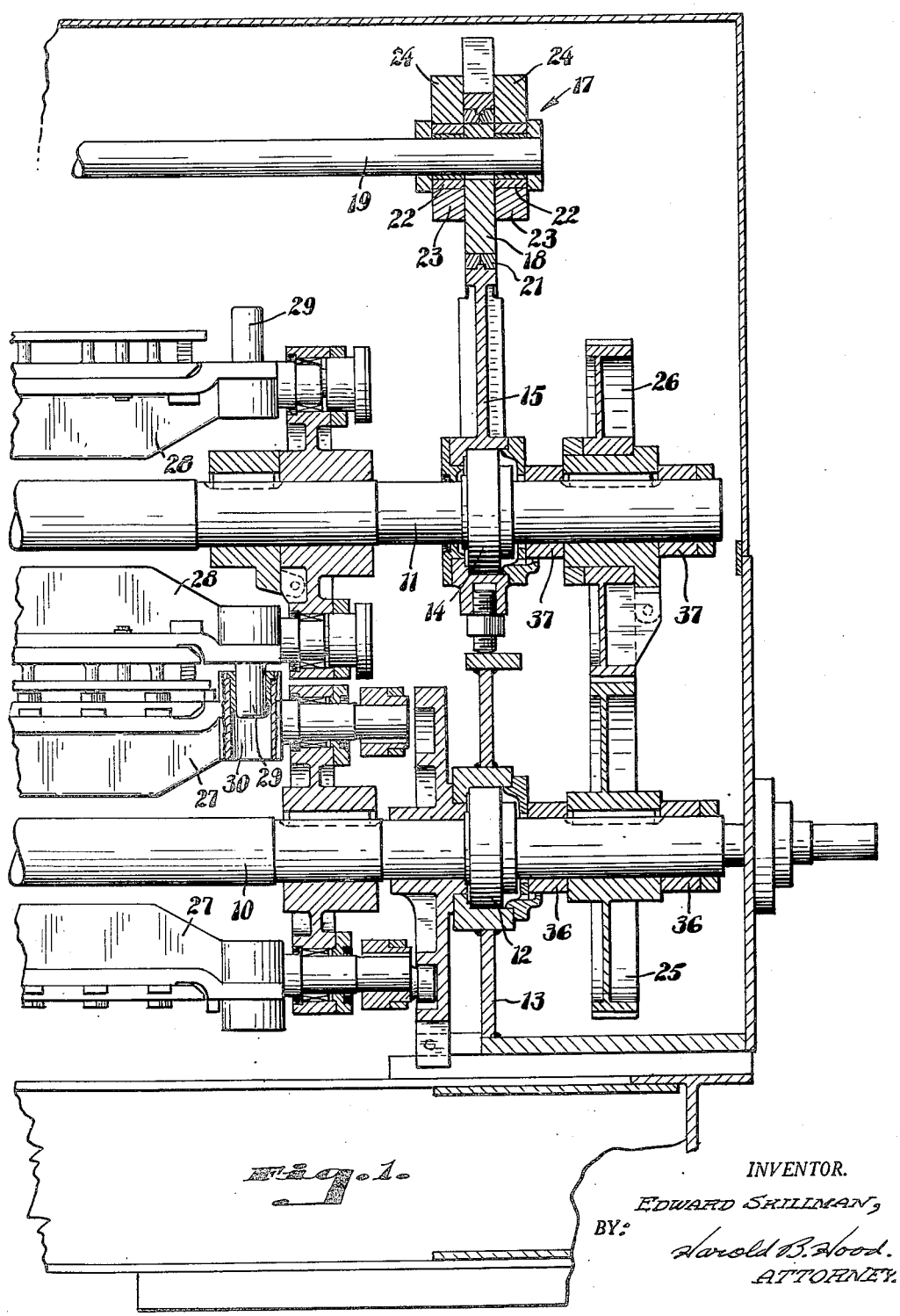
Fig. 1 is a sectional view through one end of a machine embodying my invention.

The machine parts illustrated in Fig. 1 are the same as those shown in the patent above mentioned, with a few minor changes of no importance to this invention. Such a machine, as shown, provides a pair of rotors 10 and 11. The illustrated end of rotor 10 is journalled in a suitable bearing 12 fixedly carried in the machine frame 13. Rotor 11 is journalled in a bearing 14 which is in turn carried in a movable shoe 15 arranged for sliding movement toward and away from bearing 12 in a line through the rotor axes. The shoe 15 is guided for such movement between suitable guide rails 16 carried in frame 13.

Movement of shoe 15 and the associated bearing 14 is accomplished through the medium of the mechanism indicated generally at 17. This mechanism comprises an eccentric 18 fixed to a shaft 19 rotatable through the medium of a hand wheel 20 or the like.

Eccentric 18 is rotatably supported in a shoe 21 which is in turn carried by the shoe 15. Shaft 19 is journalled in guide blocks 22, 22 which in turn are slidably mounted in guide rails 23, 23 and 24, 24 for lateral sliding movement.

To move bearing 19 relative to bearing 12, hand wheel 20 is rotated to turn eccentric 18. Shaft 19 and the associated elements are thus moved bodily either to the right or to the left as viewed in Fig. 2 (depending on the direction of rotation of hand wheel 20) and at the same time, the distance is changed between the rotor 11 and shaft 19 to shift bearing 14 relative to bearing 12.

Of course, a shoe (not shown) similar to shoe 15 mounts the bearing for the opposite end of rotor 11, and similar means actuated by the same shaft 19 correspondingly controls the position of said other shoe.

The rotors 10 and 11 respectively carry gears 25 and 26 which, when the rotors are in their closest relative positions, are intermeshed as clearly shown in Figs. 1 and 2. Each rotor mounts a hub which has radially arranged thereon a plurality of mating punch and die assemblies 27 and 28. The specific construction of these assemblies is unimportant to this invention except in that it shows the need for precise synchronism between the rotors 10 and 11 even when the gears 25 and 26 are disengaged.

Slight inaccuracies in alignment between the cooperating punch and die assemblies result in serious damage to the mating parts. To insure proper alignment, each punch-carrying bolster plate is provided with guide pins 29 and each die-carrying bolster plate is provided with cooperating guide sockets 30. In order to perform their intended function, the pins 29 must be substantially longer than the punches so that they properly align the two assemblies prior to the entrance of the punches into the dies. Due to this length of pins 29, pins 29 still interengage in sockets 20 even when the rotors are separated to such an extent as completely to disengage the gears 25 and 26. It is also to be noted that the teeth of the gears 25 and 26 will begin to lose driving interengagement almost immediately upon initiation of separation of the rotors 10 and 11 and long before the punches on the upper rotor begin to clear the dies on the lower rotor. It is therefore essential that the rotors be maintained in precise synchronism throughout such range of movement of rotor 11 toward and away from rotor 10.

To maintain a driving connection between gears 25 and 26, I provide (as is done in the patent above referred to) a pair of idler gears or pinions 31 and 32. Idler 31 is mounted on an axle 33 and idler 32 is mounted on an axle 34. Preferably, the two axles are supported in a frame 35 which maintains the axles at a fixed distance from each other and with the idlers in mesh with each other. A pair of links 36, 36 are journalled at one end for oscillation about the axes of rotor 10 and are fixed, at the other end, to axle 33 and on opposite sides of idler 31. These links hold idler 31 in mesh with gear 25.

A second pair of links 37, 37, substantially longer than links 36, 36, are journalled at one end for oscillation about the axes of rotor 11 and are fixed at a point between the ends thereof to axle 34 on opposite sides of idler 32. These links similarly hold idler 32 in mesh with gear 26.

The structure thus described does one thing: it provides a drive between rotors 10 and 11 when they are separated. It does not, however, insure proper synchronism between the rotors since the idlers would be free to climb or move partially around the gears without some means for restraining this movement. In this particular embodiment of my invention, gears 25 and 26 are of equal pitch diameter, as are idlers 31 and 32. The optimum position of the parts, for synchronism of the rotors, is that in which the idlers are maintained in such an attitude with respect to gears 25 and 26 that a line through the rotor axes is parallel with a line through the idler axes. At any rate, whatever the attitude of the line joining the idler axes, this same attitude, relative to the line joining the rotor axes, must be precisely maintained throughout relative movement of the rotors. The relation of the parts in which these lines are parallel has proved most satisfactory and is actually the most logical position.

In order to maintain parallelism between the line joining the axes of the rotors and the line joining the axes of the idlers, I have provided a mechanism 38 for guiding the ends of links 37, 37 remote from rotor 11 to move in a rectilinear path perpendicular to a plane including the rotor axes. This mechanism comprises a guide rod 39 fixed in a suitable frame 40 supported on machine frame 13. An element 41 is slidably received on shaft 39 and carries a pin 42 upon which the ends of links 37 are supported.

Movement of rotor 11 relative to rotor 10 will be followed by the attached ends of links 37. This causes the slide element 41 to move relative to the plane including the rotor axes and results also in movement of the attached idler axles.

The amount of movement of idler axles 33 and 34 will depend upon the position of the point of attachment of axle 34 to link 37 relative to rotor 11 and pin 42. I have found that in my particular arrangement, it is necessary, in order to maintain synchronism of the rotors, that the component of the movement of the idler axles which is parallel with the line of movement of the rotor axis, shall be just one-half of the degree of rotor axis movement. To accomplish this result, it is essential that the axle 34 be located in links 37 exactly halfway between rotor 11 and pin 42 or in other words, that the length of links 37 between rotor 11 and the point of attachment of axle 34 be equal to the length of the links 37 between the said point of attachment and pin 42. Such an arrangement provides a simple and rugged means for accomplishing the desired result. In spite of its simplicity, however, it has proven to be far superior to previously-known devices intended for similar functions, and it completely overcomes the deficiencies of the structure shown in my said prior patent, as outlined above.

I claim as my invention:

1. In a mechanism providing a pair of rotors mounted in bearing means for rotation about spaced parallel axes, one of said bearing means being shiftable relative to the other of said bearing means to move one of said rotors toward and away from the other of said rotors, and each of said rotors having a gear fixed thereto for interengagement to establish a driving connection between said rotors when said rotors are in their nearest relative positions, means for maintaining the driving connection between said rotors when said rotor gears are moved out of interengagement comprising an axle, an idler gear on said axle, a link oscillable about the axis of said other rotor and connected to said axle to hold said idler enmeshed with the rotor gear rotatable with said other rotor, a second axle, a second idler gear on said second axle, a frame maintaining said second axle at a fixed distance from said first axle with said idler gears in mesh with each other, a second link oscillable at one end thereof about the axis of said one rotor and connected to said second axle at a point spaced inwardly from either end of said second link to hold said second idler enmeshed with the rotor gear rotatable with said one rotor, and guide means for guiding the other end of said second link along a rectilinear path toward and away from a plane including said rotor axes during relative movement of the said bearing means.

2. The mechanism of claim 1 in which said guide means comprises a rod fixed with respect to said other rotor and substantially perpendicular to said plane including the axes of said rotors, and a slide element on said rod, said other end of said second link being attached to said slide element.

3. The mechanism of claim 2 in which the point of connection of said second link to said second axle is midway between said one rotor and said slide element.

4. In a device of the class described, a pair of rotors, bearing means for each of said rotors mounting said rotors for rotation upon spaced parallel axes, means for shifting the bearing means for one of said rotors, in a plane common to said axes, toward and away from the bearing means for the other of said rotors, a gear rotatable with each of said rotors, an axle, an idler gear on said axle, a link oscillable about the axis of said other rotor to hold said idler enmeshed with the gear rotatable with said other rotor, a second axle, a second idler gear on said second axle, a frame maintaining said second axle at a fixed distance from said first axle with said idler gears in mesh with each other, a second link oscillable at one end about the axis of said one rotor and connected to said second axle at a point intermediate the ends of said second link to hold said second idler enmeshed with the gear rotatable with said one rotor, and guide means for guiding the other end of said second link along a path substantially perpendicular to said common plane during movement of the bearing means for said one rotor.

5. The device of claim 4 in which said guide means comprises a rod fixed with respect to said other rotor and substantially perpendicular to said common plane, and a slide element on said rod, said other end of said second link being attached to said slide element.

6. The device of claim 5 in which the length of said second link between the point of attachment to said slide element and the point of connection to said second axle is substantially equal to the length of said second link between said point of connection to said second axle and the point of oscillation about said one rotor.

7. The device of claim 4 in which said rotor gears are of equal pitch diameter, said idler gears are of equal pitch diameter, and the plane common to the axes of rotation of said rotors is substantially parallel to the plane common to the axes of rotation of said idler gears, said guide means comprising a rod fixed with respect to said other rotor and substantially perpendicular to the plane common to the axes of said rotors, and a slide element on said rod, said other end of said second link being attached to said slide element, the length of said second link between the point of attachment to said slide element and the point of connection to said second axle being substantially equal to the length of said second link between said point of connection to said second axle and the point of oscillation about said one rotor, said three points lying in a common line.

EDWARD SKILLMAN.

No references cited.